(12) United States Patent
Fukuda

(10) Patent No.: US 7,645,533 B2
(45) Date of Patent: Jan. 12, 2010

(54) FUEL CELL POWER PLANT

(75) Inventor: Takashi Fukuda, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 895 days.

(21) Appl. No.: 10/520,082

(22) PCT Filed: Jun. 9, 2003

(86) PCT No.: PCT/JP03/07258

§ 371 (c)(1),
(2), (4) Date: Jan. 5, 2005

(87) PCT Pub. No.: WO2004/006369

PCT Pub. Date: Jan. 15, 2004

(65) Prior Publication Data

US 2005/0255351 A1 Nov. 17, 2005

(30) Foreign Application Priority Data

Jul. 5, 2002 (JP) ............................. 2002-197117

(51) Int. Cl.
*H01M 8/04* (2006.01)
(52) U.S. Cl. .............................. 429/22; 429/24; 429/26
(58) Field of Classification Search ........................ None
See application file for complete search history.

(56) References Cited

U.S. PATENT DOCUMENTS 6,242,119 B1 6/2001 Komura et al.
6,248,462 B1 6/2001 Bonville
6,479,177 B1 11/2002 Roberts et al.
2003/0003334 A1 * 1/2003 Yoshizawa et al. ............ 429/22
2003/0039870 A1 2/2003 Busenbender

FOREIGN PATENT DOCUMENTS

| EP | 1036996 A2 * | 9/2000 |
|---|---|---|
| JP | 06-223855 | 8/1994 |
| JP | 10-223249 | 8/1998 |
| JP | 11-214025 | 8/1999 |
| JP | 11-273704 | 10/1999 |
| JP | 2004-22198 | 1/2004 |

* cited by examiner

*Primary Examiner*—Robert Hodge
(74) *Attorney, Agent, or Firm*—McDermott Will & Emery LLP

(57) ABSTRACT

Water contained in cathode effluent from a cathode (1B) of the fuel cell power plant is condensed by a condenser (8) and recovered to a water tank (10). Water in the water tank (10) is supplied from a pump (17) to a humidifier (4) which humidifies hydrogen-rich gas supplied to an anode (1A) via a water passage (9B). When the power plant stops operating, a controller (30) first recovers water in the water passage (9B) to the water tank (10). Also, the freezing probability of the water passage (9B) is determined from the temperature detected by an outside air temperature sensor (31), and a wait time is set according to the freezing probability. By opening a drain valve (15) and draining residual water in the water passage (9B) after the wait time has elapsed, freezing of the water passage (9B) can be prevented with a minimum water drainage amount.

14 Claims, 11 Drawing Sheets

US 7,645,533 B2

FUEL CELL POWER PLANT

FIELD OF THE INVENTION

This invention relates to prevention of water in a fuel cell power plant from freezing.

BACKGROUND OF THE INVENTION

A fuel cell generates power by an electrochemical reaction between hydrogen and oxygen, and water vapor is produced at the same time. Further, the hydrogen or air used by the fuel cell is humidified before it is supplied. Therefore, there is always water in the fuel cell power plant, and when the fuel cell power plant stops operating under low temperature conditions, this water freezes during the period when the fuel cell power plant is not operated, and may interfere with the restarting of the power plant when it next starts up.

JP10-223249A published by the Japanese Patent Office in 1988 proposes discharging condensed water in the fuel cell power plant after a certain time has elapsed from when the power plant stops operating, so as to avoid this water freezing in the fuel cell power plant.

Specifically, the water remaining in internal passages is discharged by opening drains provided at certain sites in the power plant. The reason why the drains are opened after a certain time from when the power plant stops operating is that a predetermined time is required for water vapor to condense due to the temperature drop after operation has stopped.

SUMMARY OF THE INVENTION

In a fuel cell power plant provided with a reformer which extracts hydrogen by reforming hydrocarbon fuel, water vapor is used for reforming of fuel and for removing carbon monoxide from reformate gas.

Also, in a solid polymer electrolyte fuel cell (PEFC), an electrolyte membrane must be constantly maintained in a humid state during power generation. In other words, this fuel cell power plant not only produces water, but consumes water.

When the fuel cell power plant is mounted in a vehicle where it is difficult to supply water from outside, it is essential to maintain this water input/output balance. However, according to the prior art, the drains were opened to discharge water outside the plant each time the power plant stops operating, and there is a possibility that the water input/output balance in the plant would be upset leading to a deficiency of water.

It is therefore an object of this invention to prevent freezing of water in a fuel cell power plant without causing a deficiency of water.

In order to achieve the above object, this invention provides a fuel cell power plant which uses water for operation, comprising an antifreeze mechanism for preventing freezing of water in the fuel cell power plant, a sensor which detects a parameter for estimating a freezing probability of water in the fuel cell power plant after operation of the fuel cell power plant stops, and a programmable controller.

The controller is programmed to estimate the probability of water freezing in the fuel cell power plant after operation of the fuel cell power plant has stopped based on the parameter, estimate a wait time from when the power plant has stopped operating based on the freezing probability, and suspend operation of the antifreeze mechanism until the wait time has elapsed from when the fuel cell power plant stops operating.

This invention also provides a freeze prevention method for a fuel cell power plant which uses water for operation and comprises an antifreeze mechanism for preventing freezing of water in the fuel cell power plant.

The method comprises detecting a parameter for estimating a freezing probability of water in the fuel cell power plant after operation of the fuel cell power plant stops, estimating the probability of water freezing in the fuel cell power plant after operation of the fuel cell power plant has stopped based on the parameter, estimating a wait time from when the power plant has stopped operating based on the freezing probability, and suspending operation of the antifreeze mechanism until the wait time has elapsed from when the fuel cell power plant stops operating.

The details as well as other features and advantages of this invention are set forth in the remainder of the specification and are shown in the accompanying drawings.

DESCRIPTION OF THE PREFERRED EMBODIMENTS

Figure 1A:
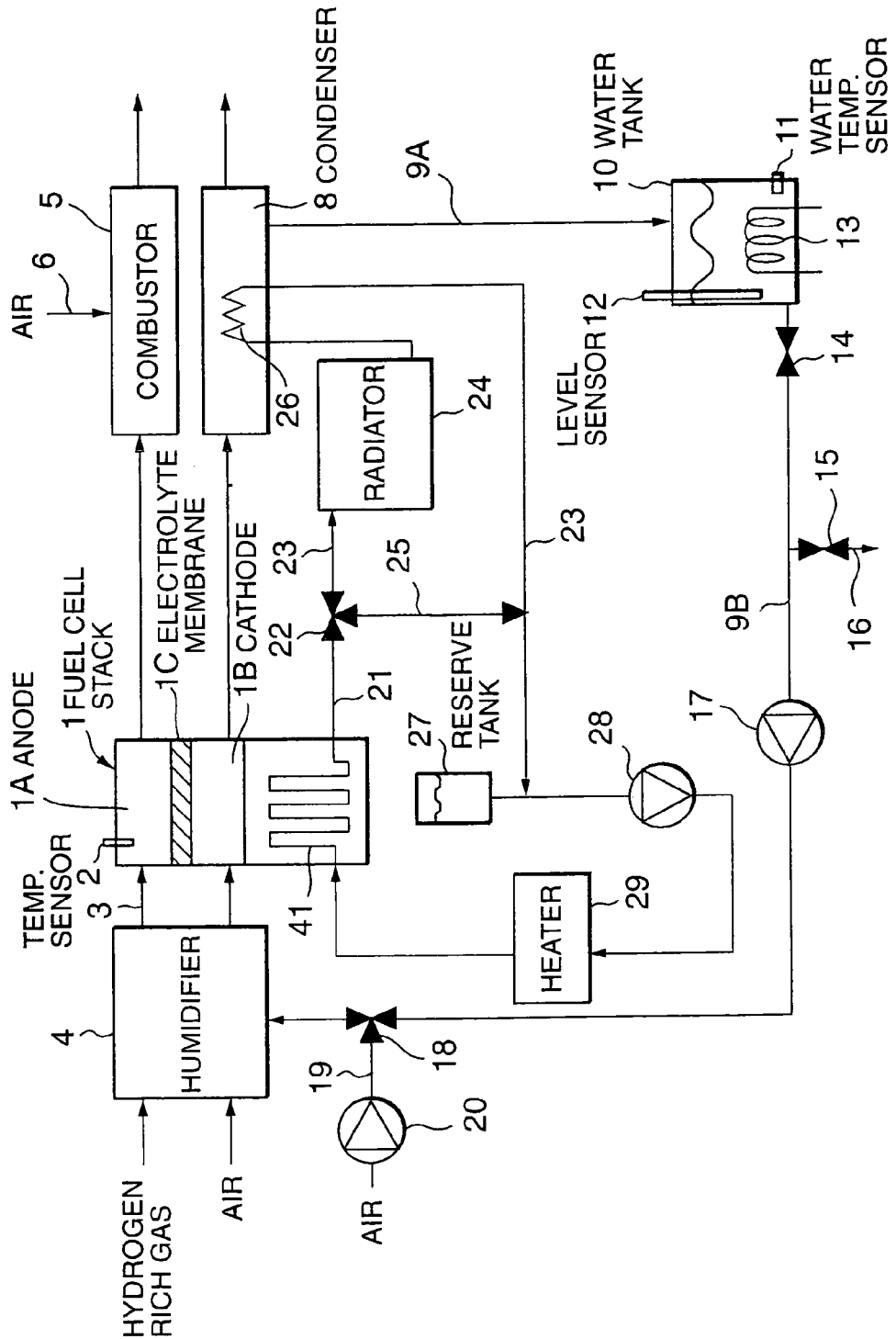
FIGS. 1A and 1B are schematic diagrams of a fuel cell power plant according to this invention.

Referring to FIG. 1A of the drawings, a fuel cell power plant for a vehicle comprises a fuel cell stack 1 based on a solid polymer electrolyte fuel cell (PEFC).

Each fuel cell comprises an anode 1A and cathode 1B provided on either side of an electrolyte membrane 1C, and generates power by an electrochemical reaction between hydrogen supplied to the anode 1A and oxygen supplied to the cathode 1B. To simplify the diagram, only one fuel cell is shown, but the fuel cell stack 1 comprises a laminate of a large number of these fuel cells arranged in series.

Hydrogen-rich gas humidified by a humidifier 4 is supplied to the anode 1A via a hydrogen supply passage 3. Air humidified by the humidifier 4 is supplied to the cathode 1B via an air supply passage 7. The hydrogen-rich gas is produced from a hydrocarbon fuel such as gasoline or methanol in a reformer, not shown.

After the electrochemical reaction in the fuel cell stack 1, anode effluent from the anode 1A and cathode effluent from the cathode 1B are respectively discharged. The anode effluent is sent to a burner 5, mixed with air from air introduced from an air inlet 6 and burnt in the burner 5, and is discharged into the atmosphere as non-toxic burnt gas.

The cathode effluent contains a large amount of water vapor which is produced as a result of the reaction between hydrogen and oxygen in the fuel cell. The cathode effluent is sent to a condenser 8, water in the cathode effluent is condensed by cooling in a heat exchanger part 26 of the condenser 8, and the effluent is then discharged into the atmosphere. Water which has condensed in the condenser 8 flows into a water tank 10 via a water passage 9A. According to this embodiment, a water-cooled condenser is used for the condenser 8, but an air-cooled heat exchanger or water separation membrane which can recover water in the cathode effluent may also be used for the condenser 8. A filter may also be provided in the water passage 9A if necessary.

The water tank 10 supplies water for humidification by the humidifier 4 via a water passage 9B. A shut-off valve 14, pump 17 and three-way valve 18 are installed in the water passage 9B. A drain 16 comprising a drain valve 15 is connected to the water passage 9B between the shut-off valve 14 and pump 17. The three-way valve 18 is a valve which selectively connects the humidifier 4 and an air pump 20 to the water passage 9B. The water tank 10 is provided with a heater 13 for warming the stored water.

The fuel cell stack 1 comprises a water passage 41 for warm-up during start-up and cooling during power generation. The water passage 41 is actually formed respectively adjacent to the anode 1A and cathode 1B of the fuel cell, but in the figure it is shown schematically for convenience.

Water is supplied to the water passage 41 from a pump 28 via a heater 29. In the water passage 41, water which has warmed up or cooled the fuel cell stack 1 is selectively discharged to a cooling passage 23 and bypass passage 25 via a passage 21 and a three-way valve 22. The cooling passage 23 is connected to a suction port of a pump 28 after passing through the heat exchanger part 26 of a radiator 24 and the condenser 8. A radiator fan is built into the radiator 24. A bypass passage 25 bypasses the radiator 24 and heat exchange part 26, and is connected to a downstream portion of the cooling passage 23.

A reserve tank 27 is provided midway in the cooling passage 23. An antifreeze such as ethylene glycol is mixed with the cooling water.

Figure 1B:
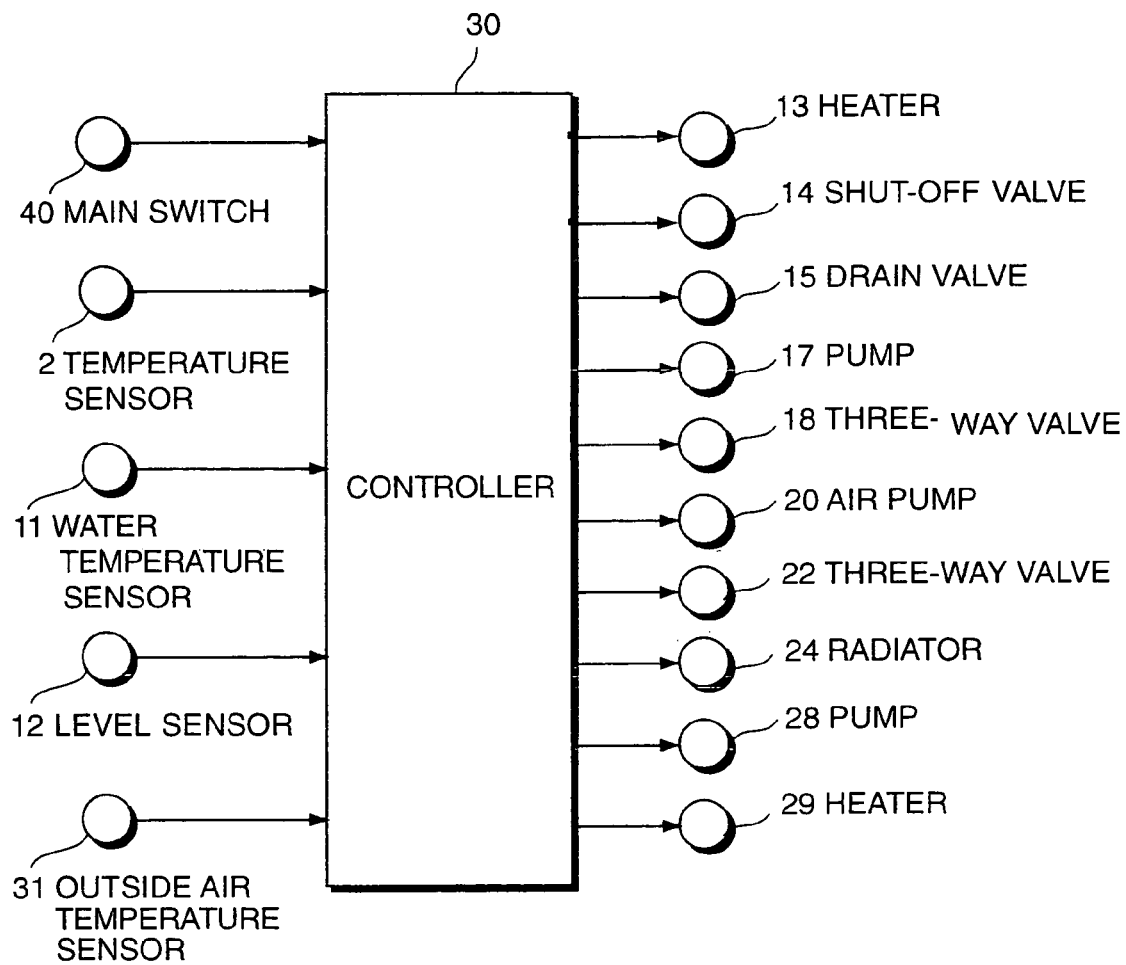

Referring to FIG. 1B, the heater 13, shut-off valve 14, drain valve 15, pump 17, three-way valve 18, air pump 20, three-way valve 22, radiator fan in the radiator 24, pump 28 and heater 29 are respectively controlled by signals output from the controller 30.

The controller comprises a microcomputer comprising a central processing unit (CPU), re-only memory (ROM), random access memory (RAM) and input/output interface (I/O interface). The controller may also comprise plural microcomputers.

Referring again to FIG. 1A, while the fuel cell power plant is operating normally, the controller 30 switches the heater 29 off, and controls the three-way valve 22 so that the passage 21 is connected to the cooling passage 23.

When the fuel cell power plant is operating normally, the fuel cell stack 1 generates heat together with power. The cooling water in the water passage 41 absorbs this generated heat, which is radiated by the radiator 24. The radiation heat amount is regulated according to the rotation speed of the radiator fan. In the heat exchanger part 26 of the condenser unit 8, the cooling water cooled by the radiator 24 cools the cathode effluent such that the water vapor in the cathode effluent condenses. Subsequently, the cooling water is recirculated to a suction port of the pump 28 via the cooling passage 23, and is again supplied to the water passage 41 of the fuel cell stack 1 from the pump 28.

When the fuel cell power plant starts, the controller 30 switches the heater 29 on, and controls the three-way valve 22 so that the passage 21 is connected to the bypass passage 25. In this way, water which has been warmed by the heater 29 is supplied to the cooling passage 41 of the fuel cell stack 1, and warms up the fuel cell stack 1. After warm-up, the water is directly recirculated to the suction port of the pump 28 via the bypass passage 25.

The reserve tank 27 maintains a suitable amount of water in the water recirculation system by storing or supplying water according to the aforesaid thermal expansion or contraction of water in the water recirculation system for cooling or warm-up.

Water is supplied to the humidifier 4 from the water tank 10 via the pump 17 and the water passage 9B. The heater 13 is used to thaw water when the water in the water tank 10 freezes on a cold start-up of the fuel cell power plant. Also, the moisture in the cathode effluent which has condensed in the condenser 8 as described above, is recovered by the water tank 10 via the water passage 9A. The shut-off valve 14 provided in the water passage 9B is used to shut-off outflow of water from the water tank 10 to the water passage 9B. The drain 16 and drain valve 15 are used to drain water from the water passage 9B. The three-way valve 18 and air pump 20 forcibly drain the water in the water passage 9B to the drain 16 by supplying compressed air to the water passage 9B.

If the fuel cell power plant stops operating at low temperature, water accumulated in the water passage 9B may freeze after the operation has stopped. Frozen water in the water passage 9B interferes with supply of water to the humidifier 4 when the system is restarted. However, as described above, if the water passage 9B is constantly drained after a certain time has elapsed from when the system stopped, the water in the water tank 10 will be insufficient even if freezing of the water passage 9B is prevented.

In this fuel cell power plant, the controller 30 estimates the probability of freezing when the operation of the power plant stops, and by draining the water passage 9B after a wait time according to the probability of freezing, freezing can be prevented while at the same time the drainage frequency is suppressed to the minimum.

To perform this control, the fuel cell power plant comprises a temperature sensor 2 which detects the temperature of the fuel cell stack 1, water temperature sensor 11 which detects the water temperature of the water tank 10, level sensor 12 which detects the water level of the water tank 10, and an outside air temperature sensor 31 which detects the outside air temperature. Also, it comprises a main switch 40 which commands the fuel cell power plant to start operating or stop operating. The output data from these sensors is respectively input to the controller 30 as signals. Also, a calendar and data pertaining to variation of atmospheric temperature in the region where the vehicle is travelling are prestored in a ROM of the controller 30.

Figure 2A:
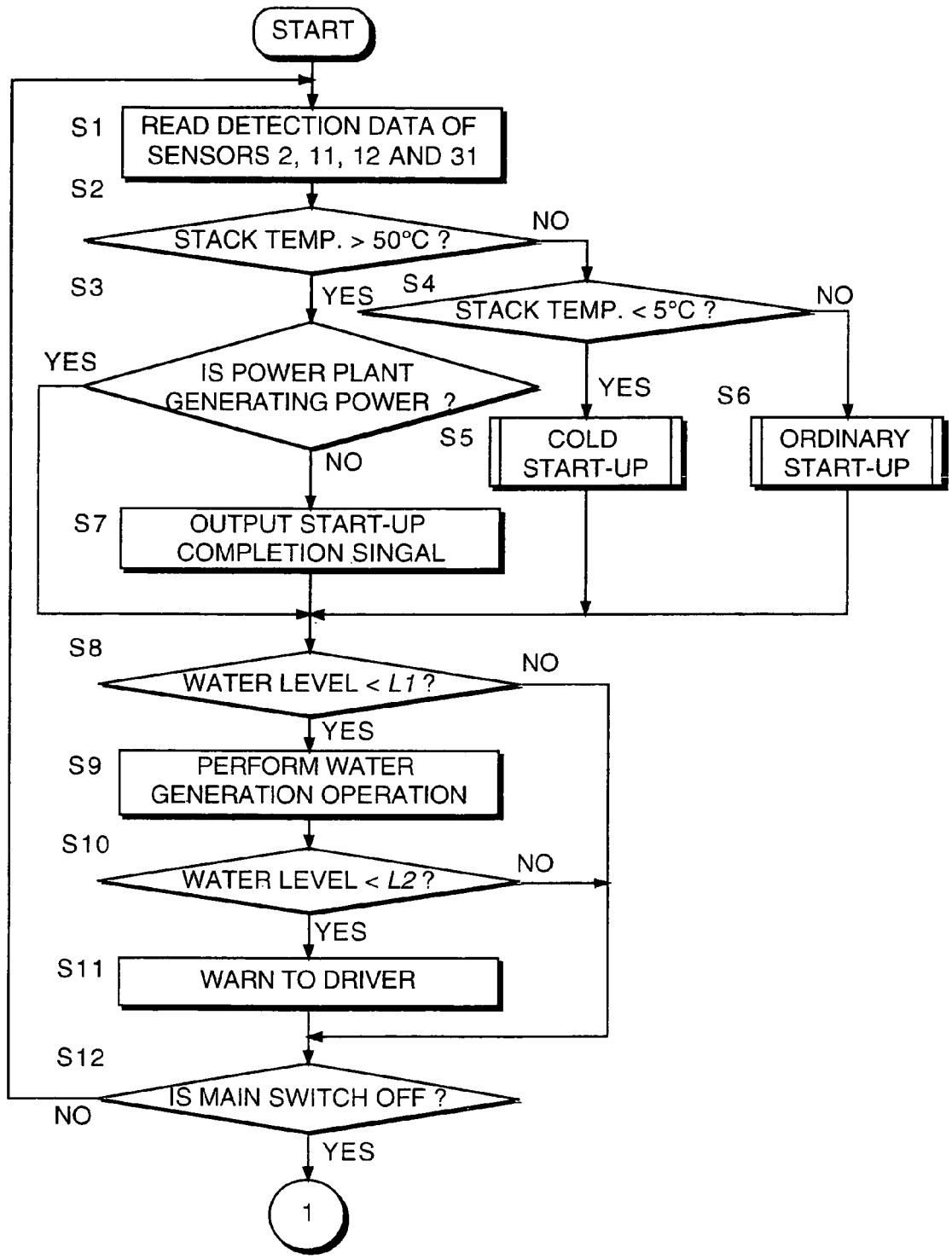
FIGS. 2A and 2B are a flowchart describing a freeze prevention routine performed by a controller according to this invention.
Figure 2B:
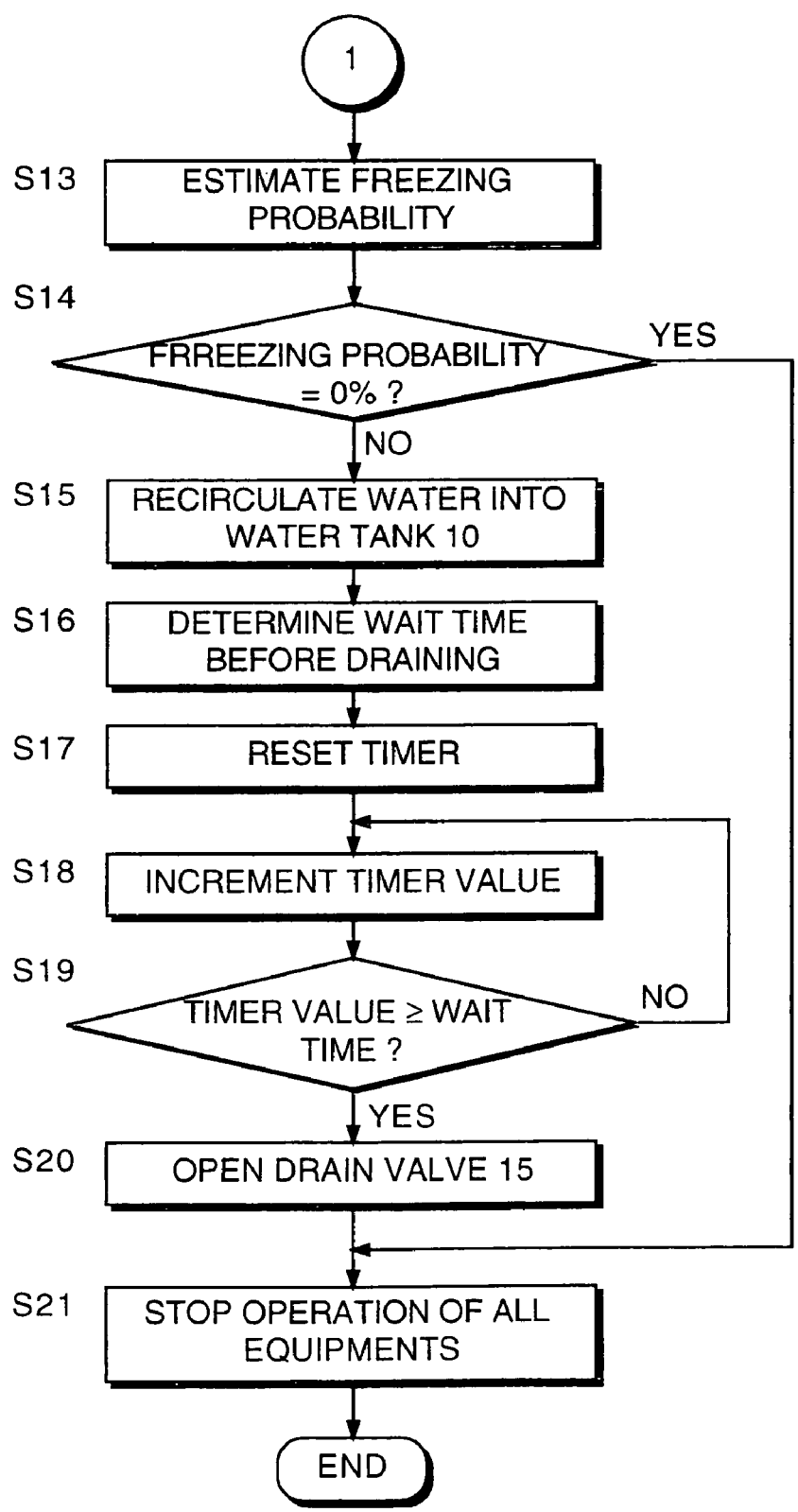

The controller 30 executes an antifreeze routine shown in FIGS. 2A and 2B using this data. This routine is started at the same time as when the main switch 40 switches on.

Referring to FIG. 2A, first, in a step S1, the controller 30 reads the output data from the sensors 2, 11, 12 and 31.

In a next step S2, it is determined whether or not the temperature of the fuel cell stack 1 is above 50° C. This step is a step for determining whether or not to perform a start-up operation. When the temperature of the fuel cell stack 1 is above 50° C. start-up operation is unnecessary. In this case, in a step S3, it is determined whether or not the fuel cell power plant is generating power. If it is not generating power, the controller 30 performs the processing of a step S7. If it is generating power, the controller 30 performs the processing of a step S8.

The power generated by the fuel cell power plant is controlled by a power control routine separately programmed in the same controller 30. The question of whether or not the fuel cell power plant is generating power is therefore known to the controller 30. The power control of the fuel cell power plant can also be performed by another controller. In this case, it is determined whether or not the fuel cell power plant is generating power based on the signal from this other controller.

In a step S7, a signal is output notifying end of start-up to the power generation control routine. The control routine starts generating power when this end of start-up signal is received, but as this power control is unrelated to this invention, its description will be omitted here. After the processing of the step S7, the controller 30 performs the processing of the step S8.

In the step S2, when the temperature of the fuel cell stack 1 is below 50° C., the controller 30, in a step S4, determines whether or not the water temperature of the water tank 10 detected by the water temperature sensor 11 is below 5° C. 5° C. is a temperature set to distinguish between cold start-up and ordinary start-up When the water temperature of the water tank is less than 5° C., in a step S5, the controller 30 executes a cold start-up subroutine shown in FIG. 7. When the water temperature of the water tank is not below 5° C., in a step S6, the controller 30 executes an ordinary start-up subroutine shown in FIG. 8. These subroutines will be described later. After the processing of the step S5 or S6, the controller 30 performs the processing of the step S8.

In the step S8, the controller 30 determines whether or not the water level is below a predetermined level L1 based on the water level of the water tank 10 detected by the level sensor 12. As the output of the level sensor 12 varies according to the disturbance of the water surface, the average value of the water level detected for example over one minute is taken as the water level of the water tank 10, and this average value is compared with the predetermined level L1. Further, it is preferred from the viewpoint of control stability to use a different value for a given level for when the water level is rising and for when the water level is falling, in other words, by assigning a hysteresis region to the determination. The hysteresis region is approximately 1/10 of the maximum water level fluctuation range.

When the water level is less than the predetermined level L1 in the step S8, the controller 30 performs a water generation operation in the step S9. Specifically, the water vapor condensing stability of the condenser 8 is enhanced by increasing the rotation speed of the radiator fan of the radiator 24, and the water amount recovered from the condenser 8 to the water tank 10 is thereby increased.

After the processing of the step S9, in a step S10, the controller 30 compares the water level with a minimum level L2 which is less than the predetermined level. The minimum level L2 is a critical level below which water supply to the humidifier 4 can no longer be performed without supplemental water supply from outside. When the water level is below the minimum level L2, in a step S11, the driver is warned of insufficient water by a warning light in the driver's compartment, etc. If supplemental water is not supplied after a predetermined time has elapsed after the warning, the operation of the fuel cell power plant is forcibly terminated.

After the processing of the step S11, the controller 30 performs the processing of a step S12. When the water level is not less than the minimum level L2 in the step S10, the step S11 is skipped and the routine proceeds to the step S12. If the water level is not less than the predetermined level L1 in the step S8, the steps S9-S11 are skipped and the routine proceeds to the step S12.

In the step S12, the controller 30 determines whether or not the main switch 40 is off. If the main switch 40 is not off, i.e., if a command to stop operation of the fuel cell power plant has not been issued, the controller 30 repeats the processing of the steps S1-S12.

If the main switch 40 is off, it means that a command has been issued to stop operation of the fuel cell power plant. In this case, the controller 30 executes the processing for when operation has stopped in steps S13-S21 shown in FIG. 2B.

Referring to FIG. 2B, in the step S13, the controller 30 determines whether or not there is a risk that water in the power plant will freeze after operation has stopped.

Figure 3:
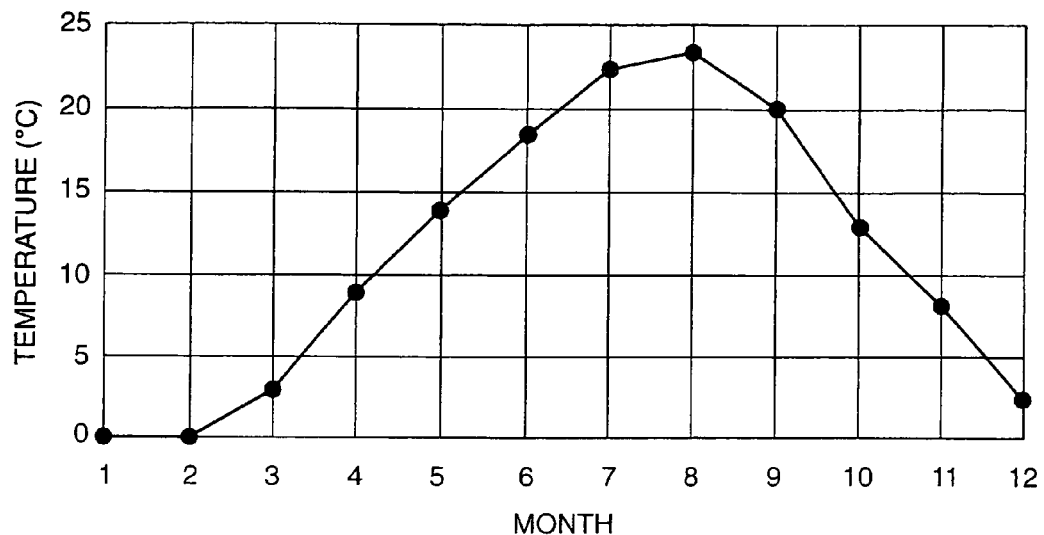
FIG. 3 is a diagram showing a minimum outside temperature model for each month in Tokyo, Japan.

FIG. 3 shows an outside temperature model for each month in Tokyo, Japan. From this diagram, it is seen that there is a risk that water in the fuel cell power plant may freeze during the period from December to March. The period when freezing may occur depends on the region, being longer in cold areas and shorter in warm areas.

Figure 4:
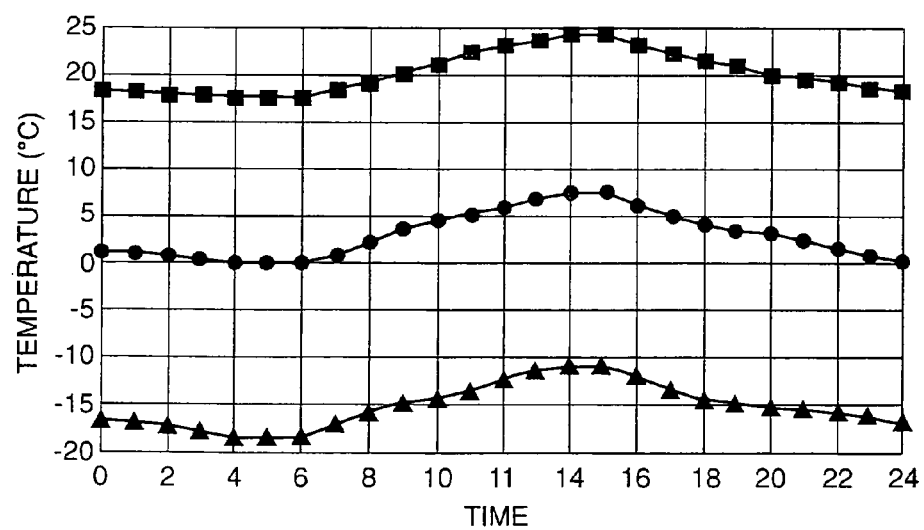
FIG. 4 is a diagram showing a typical average daily atmospheric temperature variation model for the month of February according to region.

FIG. 4 is a diagram which gives a model representation of the average daily temperature fluctuation for the month of February in Japan according to region. In this diagram, the curve joined by the square dots represents warm areas, the curve joined by the triangular dots represents cold areas, and the curve joined by the round dots represents intermediate areas. In the controller 31, the monthly atmospheric temperature variation in the intermediate areas is prestored in a memory, and the temperature variation after the fuel cell power plant has stopped operating is predicted by shifting the stored data for the corresponding month based on the temperature outside the vehicle detected by an outside air temperature sensor 31.

For example, consider the case where the main switch 40 has switched off at four o'clock in the afternoon, when the outside air temperature is 23° C. The controller 30 looks up the value for four o'clock in the afternoon, i.e., 16 o'clock in the figure, from the atmospheric temperature variation data stored in the ROM, and obtains 7° C. A deviation of 16° C. between the outside air temperature and atmospheric temperature variation data is then obtained by calculation. If the minimum air temperature of the air temperature variation data stored in the ROM is 1° C., a value of 17° C., obtained by adding the deviation of 16° C. to 1° C., is considered to be the minimum air temperature predicted in the next 24 hours.

Figure 5:
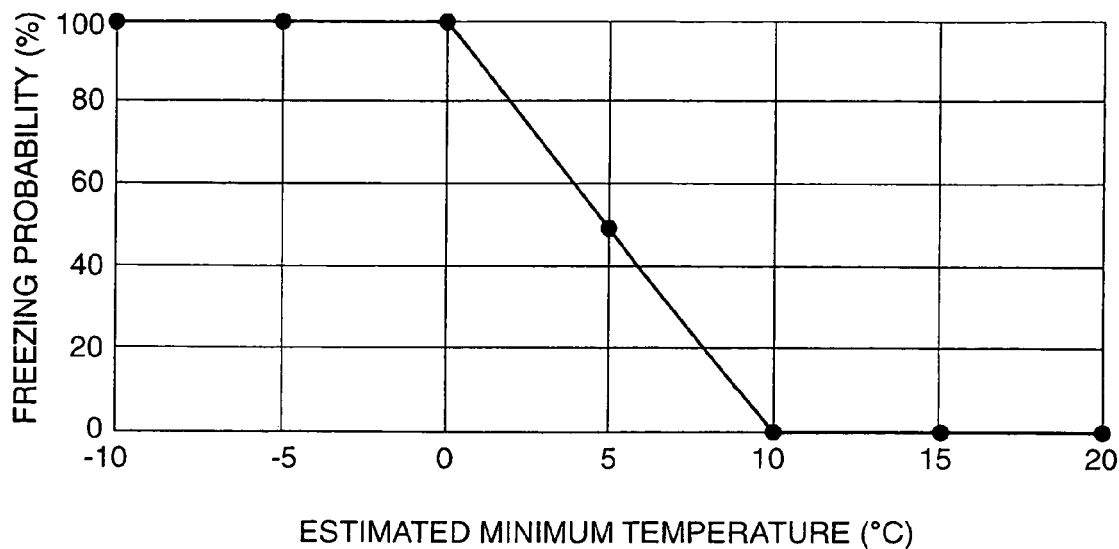
FIG. 5 is a diagram describing the characteristics of a map specifying a relation between estimated minimum temperature and freezing probability stored by the controller.

After predicting the minimum air temperature in this way, the controller 30 calculates the freezing probability from the minimum air temperature by looking up a map having the characteristics shown in FIG. 5 which is prestored in the ROM. Describing this map, when the predicted minimum temperature is 0° C. or less, the freezing probability is estimated to be 100%. On the other hand, if the predicted minimum air temperature is 10° C. or more, the freezing probability is estimated to be 0%. It is thus considered that the freezing probability between 0° C. and 10° C. varies in a straight line from 100% to 0%. As described above, if the predicted minimum air temperature is 17° C., the possibility that water will freeze is therefore 0%.

Regarding the prediction of freezing probability in the step S13, various options exist. Specifically, estimation precision can be increased by using a car navigation system to obtain information pertaining to the current position of the vehicle, storing data in the controller 30 concerning the atmospheric temperature variation at various positions in a storage device, reading the data concerning atmospheric temperature variation corresponding to the current position from the storage device, and thereby predicting the atmospheric temperature variation. Estimated atmospheric temperatures can also be obtained directly from weather information services.

After predicting the freezing probability in the step S13, the controller 30, in a next step S14, determines whether or not the freezing probability is 0%. If the freezing probability is 0%, after issuing a command to stop operation of all control devices in a step S21, the routine is terminated.

On the other hand, when freezing probability is not 0%, the controller 30 performs the processing of steps S15-S19.

First, in the step S15, the controller 30 operates the three-way valve 18 to connect the air pump 20 to the water passage 9B. Compressed air sent from the air pump 20 to the water passage 9B recirculates the water remaining in the water passage 9B to the water tank 10. The water pump 17 uses a pump having a construction which allows recirculation of water. For example, when a gear pump, preferably of Teflon coated gears, is used for the water pump 17, gears are rotated in the reverse direction due to the air pressure supplied from the air pump 20, and the remaining water in the water passage 9B is recirculated to the water tank 10 through the pump 17 guided by the gears rotating in the reverse direction.

The time required to recover all of the remaining water in the water passage 9B to the water tank 10 due to supply of compressed air, can previously be found by experiment. After compressed air is supplied from the air pump 20 to the water passage 9B for this predetermined time, the controller 30 closes the shut off valve 14, and stops operation of the air pump 20.

After water recovery in the water passage 9B has terminated, in the step S16, the controller 30 determines a wait time based on the freezing probability and the water temperature detected by the water temperature sensor 11. Here, the wait time means the time from a timer reset described later to discharge processing execution. In this map, the lower the water temperature is, and the higher the freezing probability is, the shorter the wait time is.

In the next step S17, the controller 30 resets the timer. In the next step S18, the controller 30 increments the timer. In the next step S19, it is determined whether or not the timer value has reached the wait time. The processing of the steps S18 and S19 is repeated until the timer value reaches the wait time.

When the timer value reaches the wait time in the step S19, the controller 30 opens the drain valve 15 in the step S20, outputs a command signal to stop operation of all control devices in the step S21, and terminates the routine.

In this routine, the process for recovering water in the water passage 9B performed in the step S15, may also be performed immediately prior to opening the drain valve 15 in the step S20.

Figure 7:
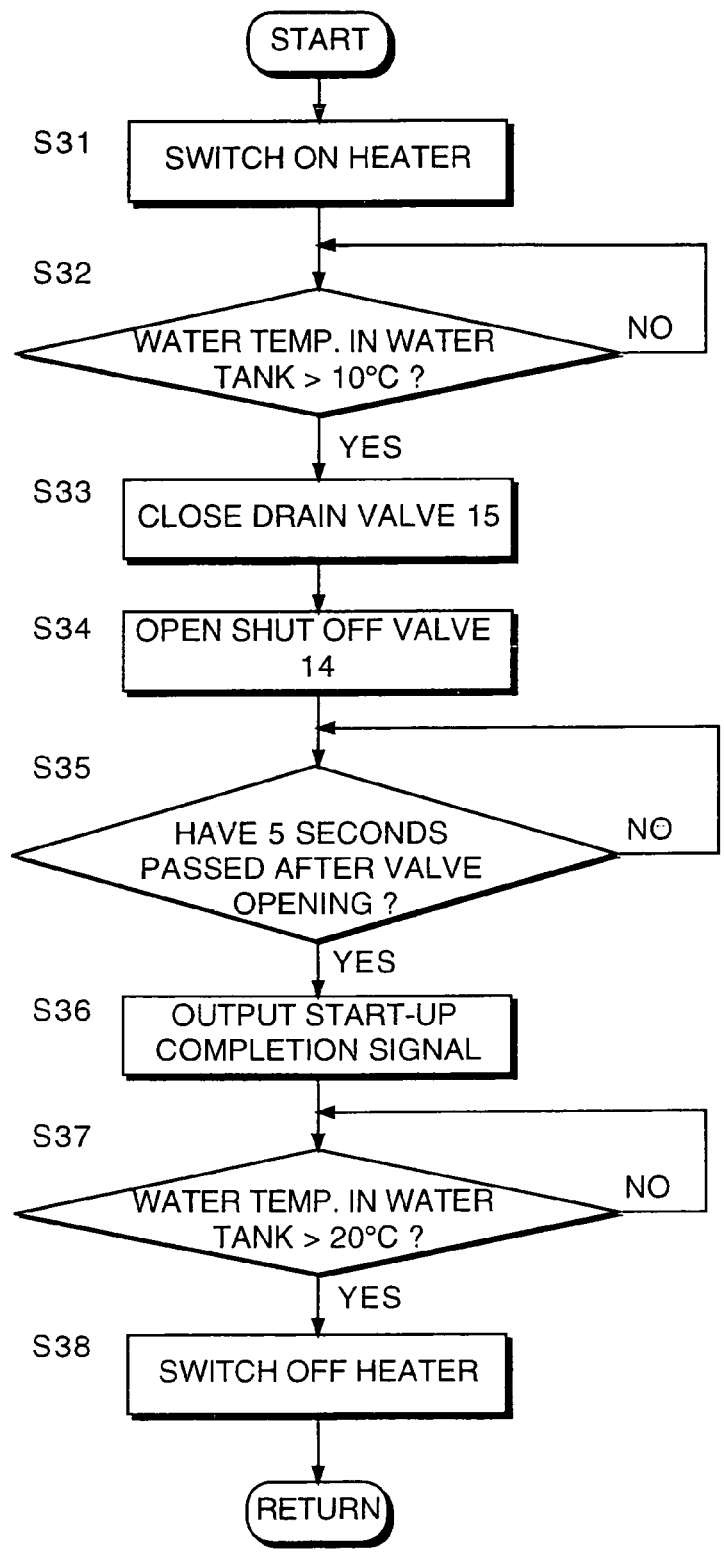
FIG. 7 is a flowchart describing a cold start-up control routine performed by the controller.

Referring to FIG. 7, the cold start subroutine performed by the controller 30 in the step S5 of FIG. 2A will now be described.

The controller 31 first switches the heater 13 in the water tank 10 on in a step S31.

In a next step S32, it is determined whether or not the water temperature of the water tank 10 detected by the water temperature sensor 11 is above 10° C. The routine then waits until the water temperature exceeds 10° C.

When the water temperature has exceeded 10° C. in the step S32, the controller 30 closes the drain valve 15 in a step S33. In the antifreeze routine of FIGS. 2A and 2B performed when the fuel cell power plant stopped operation on the immediately preceding occasion, if the processing of the step S20 was not performed, the drain valve 15 is closed. In this case, in a step S33, the controller 30 maintains the drain valve 15 in the closed state.

In a next step S34, the controller 30 opens the shut off valve 14. In a next step S35, after waiting five seconds, a command is issued to start generating power in a step S36. This processing is identical to the processing of the step S7 of FIG. 2A, and the command applies to the power generation control routine set separately as described above. The five second wait in the step S36 corresponds to the time from when water flowing out from the water tank 10 to the water passage 9B fills the suction port of the water pump 17. It is preferred that this wait time is experimentally set according to the construction of the water passage 9B. It shall be assumed that the subsequent operation of the water pump 17 is controlled by the power generation control routine.

In a following step S37, it is determined whether or not the water temperature of the water tank 10 is higher than 20° C. The routine then waits until the water temperature exceeds 20° C. When the water temperature exceeds 20° C., the controller 30 switches off energization of the heater 13 in a step S38 and terminates the routine.

Figure 8:
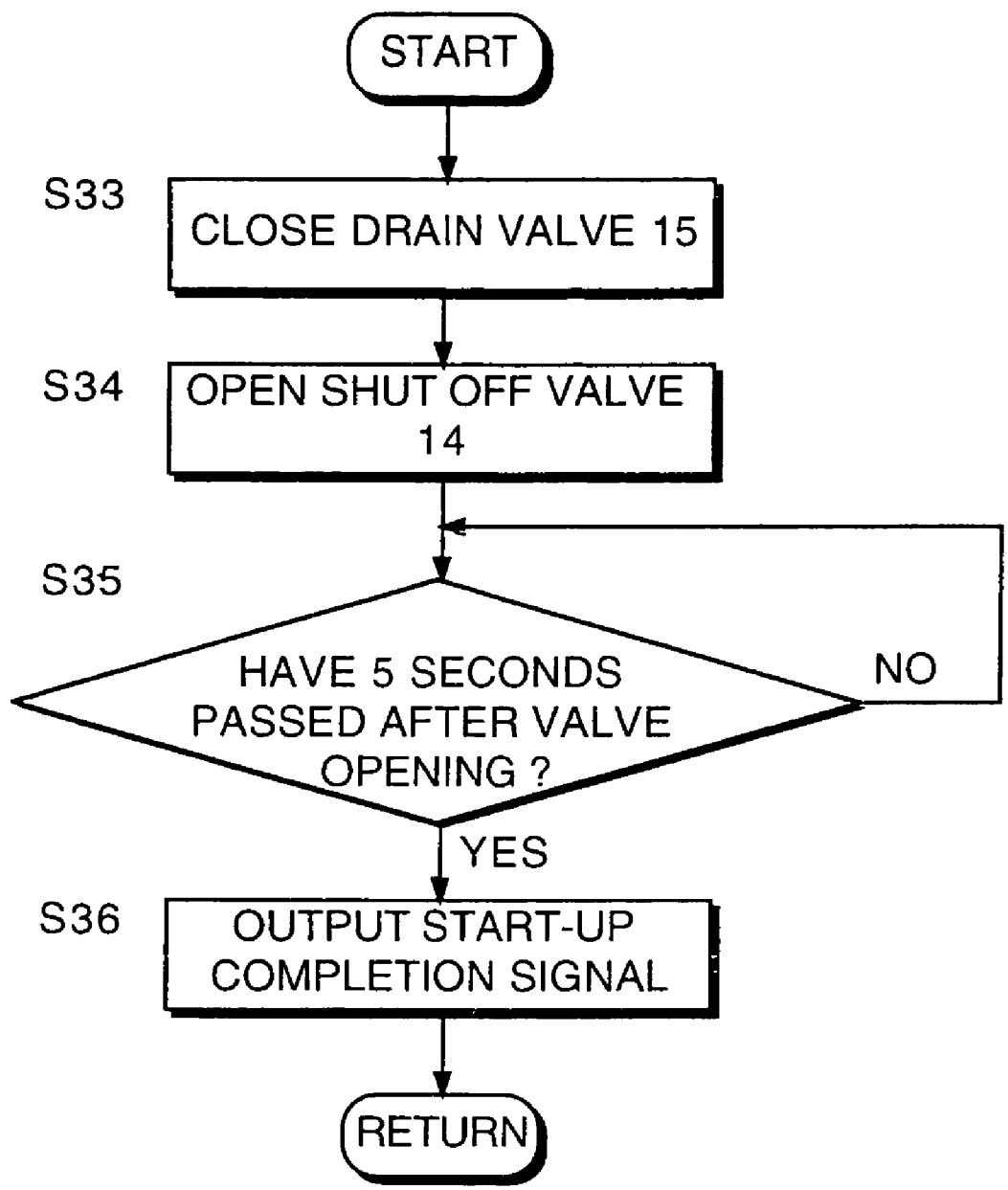
FIG. 8 is a flowchart describing an ordinary start-up control routine performed by the controller.

Next, the ordinary start-up subroutine performed by the controller 30 in a step S6 of FIG. 2A will be described referring to FIG. 8.

The processing of steps S71-S73 is identical to the processing of the steps S33-S35 of FIG. 7, and the processing of a step S74 is identical to the processing of the step S36 of FIG. 7.

Specifically, the controller 30 closes the drain valve 15 and supplies water from the water tank 10 to the water pump 17. After waiting five seconds, the controller 30 issues a power generation start command to the power generation control routine, and terminates the subroutine. The difference between the ordinary start routine and cold start routine is that the water tank 10 is not heated by the heater 13.

As described above, when operation stops, the fuel cell power plant firstly recovers water remaining in the water passage 9B to the water tank 10 under the air pressure of the air pump 20. After the wait time according to the freezing probability predicted from the air temperature data, the drain 15 is then opened and the water remaining in the water passage 9B is discharged to the outside.

The water discharged from the drain valve 15 to the outside is therefore limited to the remaining water which could not be recovered by the air pressure of the air pump 20. Also, the wait time until the drain valve 15 opens is set according to the freezing probability. Compared to the prior art where water was not recovered first and the drain valve 15 was mechanically opened after a given time elapsed from when operation stops, freezing can be more effectively prevented, while the water drainage amount and drainage frequency are largely reduced.

Instead of opening the drain valve 15 to drain the remaining water in the water passage 9B, the heater 13 can also be operated to prevent freezing.

According to this embodiment, the water supply/recovery mechanism which supplies water to the humidifier 4 and recovers water in the cathode effluent, is different from the warm-up/cooling mechanism which warms or cools the fuel cell stack 1. In this construction, freezing prevention is applied to the water passage 9B of the water supply/recovery mechanism.

The freezing prevention according to this invention may be however applied to the warm-up/cooling mechanism.

Also, as both of these mechanisms use water, they may be linked. For example, a valve may be provided to supply condensed water from the condenser 8 to the cooling passage 23, and a level sensor may be provided in the reserve tank 27. Thus, more water can be supplied to the warm-up/cooling mechanism by supplying the condensed water in the condenser 8 to the cooling passage 23 according to the drop in level of the reserve tank 27.

Next, a second embodiment of this invention will be described referring to FIGS. 9 and 10.

This embodiment concerns the antifreeze routine, the controller 30 having a separate chip set which has a function to cause the CPU to sleep, a timer function, and a function to reactivate the CPU during sleep by an interrupt operation while the timer counts a predetermined time. The remaining features of the construction of the fuel cell power plant are identical to those of the first embodiment shown in FIG. 1.

According to this embodiment, the CPU of the controller 30 is activated intermittently when the vehicle has stopped, and freezing of the fuel cell power plant is observed while antifreeze measures are taken. For this purpose, the controller 30 executes a freeze prevention routine shown in FIGS. 9A, 9B. This routine starts to be executed when the fuel cell power plant starts, i.e., when the main switch 40 is switched on, and continues even after the main switch 40 is switched off until predetermined termination conditions are satisfied.

Figure 9A:
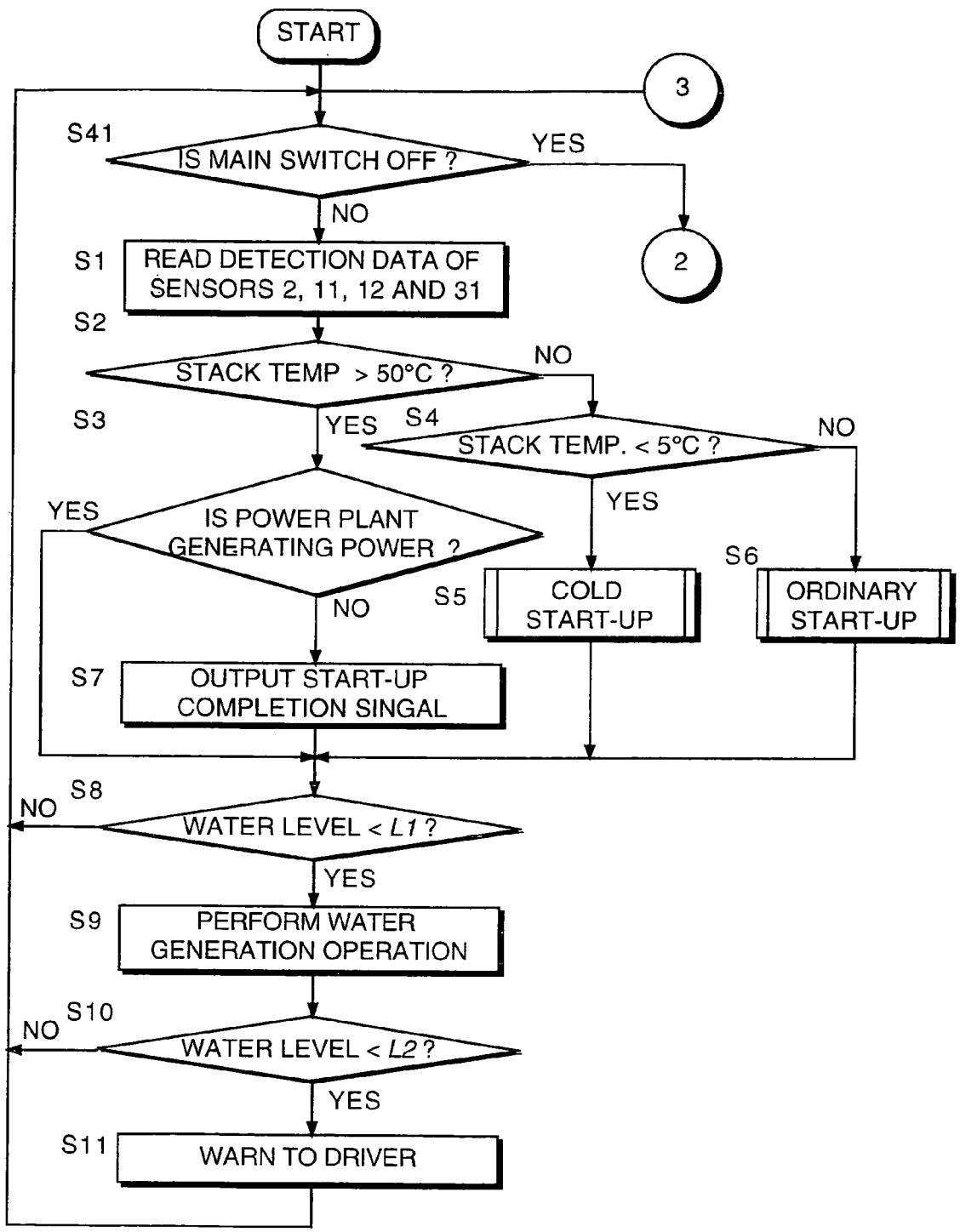
FIGS. 9A and 9B are a flowchart describing a freeze prevention routine performed by the controller according to a second embodiment of this invention.
Figure 9B:
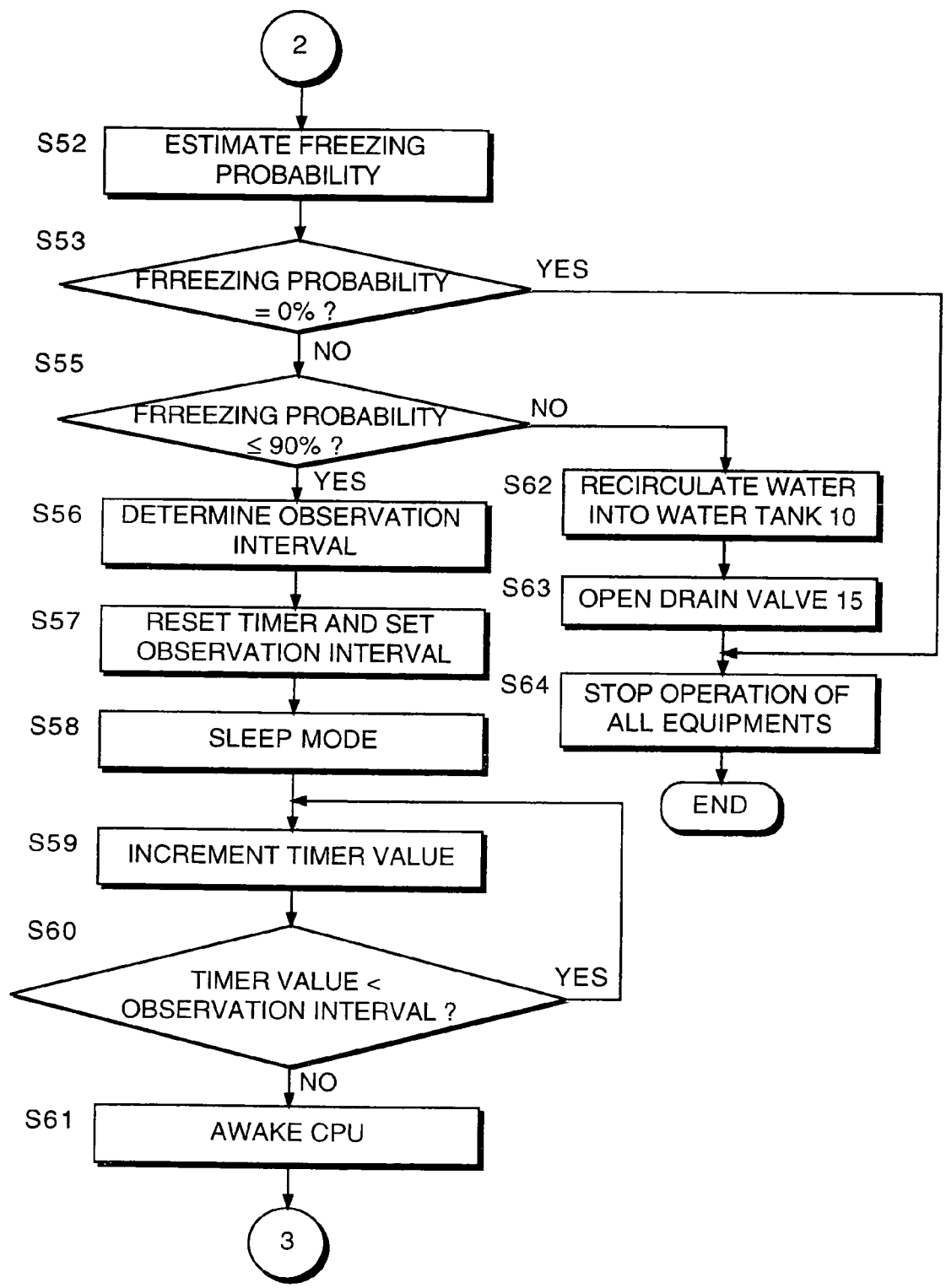
Figure 10:
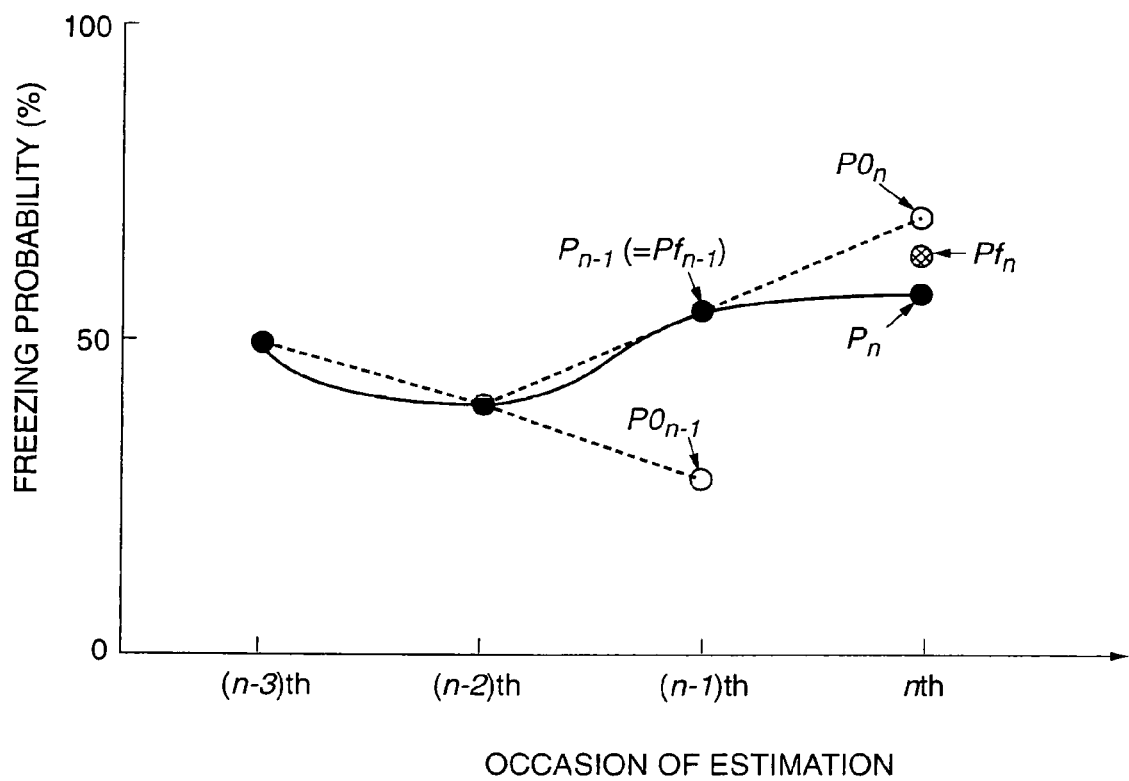
FIG. 10 is a diagram describing a method of correcting freezing probability applied by the controller according to the second embodiment of this invention.

Referring to FIG. 9A, first in a step S41, the controller 30 determines whether or not the main switch 40 is on. If the main switch 40 is on, the processing of the step S1-S11 is performed, and when the main switch 40 is off, the processing of steps S52-S64 shown in FIG. 9B is performed.

The steps S1-S11 relate to control of the water supply/recovery mechanism during operation of the fuel cell power plant, and the details of the processing are identical to those of the steps S1-S11 shown in FIG. 2A. However, in this embodiment, after the processing of the step S11, or when the water level in the water tank 10 is not less than the predetermined level L1 in the step S8, or when the water level in the water tank 10 is not less than the minimum level L2 in the step S10, the routine returns to the step S41 and repeats the processing of the step S41 and subsequent steps instead of terminating the routine as in the case of the first embodiment.

If the main switch 40 is off in the step S41, it means that a command has been issued to stop operation of the fuel cell power plant. In this case, first, in the step S52 of FIG. 9B, the controller 30 determines whether or not water in the power plant may freeze. This determination uses a different algorithm to that applied in the step S12 of the first embodiment. Specifically, according to this embodiment, in FIG. 4, the region among three regions showing the nearest temperature to the temperature detected by the outside air temperature sensor 31 is selected, and the freezing probability is determined based on the temperature variation characteristics of this region.

In the first embodiment, the minimum air temperature was predicted by calculating the shift amount of the temperature detected by the outside air temperature sensor 31 from the air temperature corresponding to the intermediate region, but in this case, differences in the way the daily air temperature fluctuates depending on the region lead to errors. According to this embodiment, temperature data for the region selected based on the outside air temperature sensor 31 is used, so the precision of estimating the freezing probability is enhanced.

The freezing probability is estimated by looking up a map having the characteristics shown FIG. 5 in the same way as the first embodiment, and in order to make the estimation of freezing probability more reliable, it is preferred to correct the current estimation values based on the variation of past freezing probability estimation values.

The correction method will now be described referring to FIG. 10. Herein, a current freezing probability estimated value $PO_n$ is calculated when it is assumed that the freezing probability varies linearly, from a difference between the freezing probability estimation value $P_{n-1}$ on the immediately preceding occasion and the freezing probability estimation value $P_{n-2}$ two occasions ago. When the current freezing probability estimation value based on the temperature detected by the outside air temperature sensor 31 is less than $PO_n$, the freezing probability estimation value $P_n$ is corrected in the increasing direction.

In the figure, a value $PO_n$ on the broken line connecting the estimation value $P_{n-2}$ two occasions ago and the estimation value $P_{n-1}$ on the immediately preceding occasion, is compared with the freezing probability estimation value $P_n$ based on the temperature detected by the outside air temperature sensor 31, and if $P_n$ is less than $PO_n$, a correction value $Pf_n$ is calculated by the following equation (1), and this value is taken as the freezing probability estimation value $P_n$.

$$Pf_n = P_n + \frac{PO_n - P_n}{2} \qquad (1)$$

Due to this correction, even when there is a strong temperature fluctuation, freezing of water in the fuel cell power plant due to an incorrect determination of freezing probability can be prevented.

After calculating the freezing probability in this way as described in the step S52, the controller 30 determines whether or not the freezing probability is 0% in the following step S53. When the freezing probability is 0%, in a step S64, the controller 30 outputs a command signal which stops operation of all control devices, and terminates the routine. In this case, the drain valve 15 therefore remains closed.

When the freezing probability is not 0%, in the step S55, the controller 30 determines whether or not the freezing probability is 90% or less.

When the freezing probability is 90% or less, the routine performs the processing of the steps S56-S61. When the freezing probability exceeds 90%, the routine performs the processing of the steps S62-S64.

In the step S62, as in the step S15 of FIG. 2B, the air pump 20 and three-way valve 18 are operated to recirculate water remaining in the water passage 9B to the water tank 10. After performing this processing for a predetermined time, the controller 30 closes the shut-off valve 14 and stops operation of the air pump 20.

After the processing of the step S62, in the next step S63, the controller 30 opens the drain valve 15 as in the step S20 of FIG. 2B. Subsequently, a command signal is output to stop operation of all control devices in the step S64, and terminate the routine.

Figure 6:
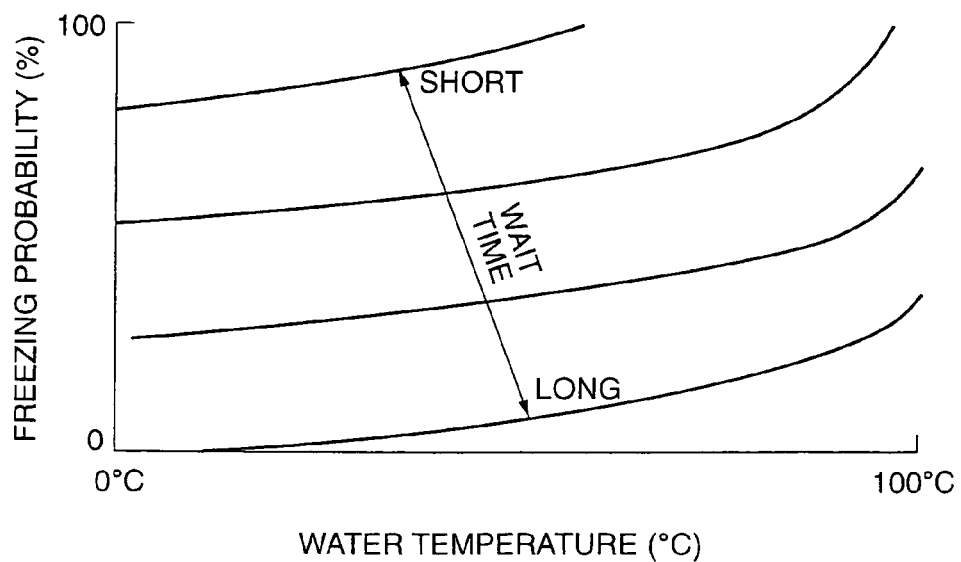
FIG. 6 is a diagram describing the characteristics of a map specifying a relation between water temperature, freezing probability and wait time stored by the controller.

On the other hand, when the freezing probability is 90% or less in the step S55, the controller 30 sets the wait time. Herein, the wait time is set based on the freezing probability and the water temperature detected by the water temperature sensor 11 by looking up a map having the characteristics shown in FIG. 6 used in the first embodiment.

After setting the wait time, the controller 30 resets the timer in the aforesaid chip set, enters the wait time into the timer, and in the following step S58, enters a sleep mode wherein the CPU and RAM do not function. The next steps S59-S61 therefore pertain to the operation of the chip set.

In the step S59, the chip set increments the timer. In the step S60, it is determined whether or not the timer value has reached the wait time. Until the timer value reaches the wait time, the chip set repeatedly increments the timer value of the step S59 and repeats the determination of the step S60 at a fixed time interval.

When the timer value reaches the wait time in the step S60, the chip set resets the CPU by an interrupt operation in the step S61. Due to this operation, the CPU and RAM again return to the operating state, the routine returns to the step S41, and the step S41 and subsequent processing are repeated.

According to the first embodiment, when the freezing probability is not 0%, the drain valve 15 was opened after the wait time according to the freezing probability had elapsed after the main switch 40 was switched off. According to this embodiment, the controller 30 again calculates the freezing probability, and determines whether or not to immediately open the drain valve 15 according to this result.

Therefore, the time until freezing starts can be estimated with high precision, and there is a higher probability of operation without performing unnecessary water drainage than in the first embodiment. Also, the CPU and RAM are put into the sleep state during the wait time, so power consumption required for monitoring can be suppressed to the absolute minimum.

The above intermittent activation of CPU and the successive execution of the routine consume electric power provided from a secondary battery mounted on the vehicle. Considering the general capacity of the secondary battery, the above sleep and activation processing can be maintained for about one week after the power generation by the power plant has stopped. Although not described in the flowchart, it is preferable to stop the routine when one week has passed after the main switch was turned off, by performing the steps S62-S64 as in the case where the freezing probability exceeds 90%.

The contents of Tokugan 2002-197117, with a filing date of Jul. 5, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid first and second embodiments, the air temperature detected by the outside air temperature sensor 31 was used as a parameter to estimate the freezing probability, but it is also possible to simply determine if there is a risk of freezing, and if there is a risk of freezing, the wait time may be set based on the temperature detected by the water temperature sensor alone.

Also, according to the first and second embodiments, the air temperature detected by the outside air temperature sensor 31 was used as a parameter to estimate the freezing probability, but the outside air temperature can be estimated without using the outside air temperature sensor 31. Specifically, the current position of the vehicle may be obtained from the aforesaid car navigation system, the daily minimum air temperature at the current position estimated from the present position, the calendar and data relating to air temperature variation according to region built into the controller 30, and the freezing probability estimated based on the estimated air temperature.

INDUSTRIAL FIELD OF APPLICATION

As described above, according to this invention, freezing in a fuel cell power plant can be effectively prevented, while the water amount which is drained can be suppressed to the absolute minimum. Therefore, particularly good results are obtained by applying this invention to freeze prevention in a fuel cell power plant for a vehicle used under various climatic conditions where it may be difficult to supply more water from outside.

The embodiments of this invention in which an exclusive property or privilege is claimed are defined as follows:

1. A fuel cell power plant which uses water for operation, comprising:
   an antifreeze mechanism for preventing freezing of water in the fuel cell power plant;
   a sensor which detects a parameter for estimating a freezing probability of water in the fuel cell power plant after operation of the fuel cell power plant stops; and
   a programmable controller programmed to:
   estimate the freezing probability of water in the fuel cell power plant after operation of the fuel cell power plant has stopped based on the parameter;
   estimate a wait time from when the power plant has stopped operating based on the freezing probability; and
   suspend operation of the antifreeze mechanism until the wait time has elapsed from when the fuel cell power plant stops operating.

2. The power plant as defined in claim 1, wherein the controller is further programmed to set the wait time to be shorter as the freezing probability increases.

3. The power plant as defined in claim 1, wherein the fuel cell power plant further comprises a sensor which detects the water temperature inside the fuel cell power plant, and the controller is further programmed to set the wait time to be longer as the water temperature when the fuel cell power plant stops operating rises.

4. The power plant as defined in claim 1, wherein the controller is further programmed to operate the antifreeze mechanism after the wait time has elapsed.

5. The power plant as defined in claim 4, wherein the controller is further programmed to update the freezing probability based on the parameter detected after the wait time has elapsed, and operate the antifreeze mechanism only when an updated freezing probability exceeds a predetermined factor.

6. The power plant as defined in claim 5, wherein the controller is further programmed, when the updated freezing probability does not exceed the predetermined factor, to recalculate the wait time based on the updated freezing probability, re-update the freezing probability after the recalculated wait time has elapsed, and operate the antifreeze mechanism only when the re-updated freezing probability exceeds the predetermined factor.

7. The power plant as defined in claim 6, wherein the controller is further programmed to predict a variation characteristic of freezing probability from a variation of the estimated freezing probability in the past, and correct the re-updated freezing probability based on the variation characteristic.

8. The power plant as defined in claim 4, wherein the power plant comprises a water recovery mechanism which recovers and stores part of the remaining water when the power plant stops operating, and the controller is further programmed to operate the water recovery mechanism before operating the antifreeze mechanism.

9. The power plant as defined in claim 1, wherein the antifreeze mechanism comprises a drain valve which drains part of remaining water in the fuel cell power plant.

10. The power plant as defined in claim 9, wherein the power plant further comprises a fuel cell stack comprising an anode and a cathode, a condenser which condenses water vapor in cathode effluent discharged from the cathode, a water tank which recovers water condensed in the condenser, a humidifier which humidifies gas supplied to the anode, and a water passage which supplies water for humidification to the condenser from the water tank, the antifreeze mechanism comprises a drain which drains water from the water passage, and the drain valve which opens and closes the drain.

11. The power plant as defined in claim 1, wherein the antifreeze mechanism comprises a heater which heats part of the remaining water in the fuel cell power plant.

12. The power plant as defined in claim 1, wherein the parameter comprises one of an outside air temperature and climactic data corresponding to a present location of the power plant.

13. The power plant as defined in claim 1, wherein the sensor comprises a sensor which detects a temperature outside the power plant as the parameter, and the controller is further programmed to calculate the freezing probability based on the outside air temperature.

14. A fuel cell power plant which uses water for operation, comprising:
- means for preventing freezing of water in the fuel cell power plant;
- means for detecting a parameter for estimating a freezing probability of water in the fuel cell power plant after operation of the fuel cell power plant stops;
- means for estimating the probability of water freezing in the fuel cell power plant after operation of the fuel cell power plant has stopped based on the parameter;
- means for estimating a wait time from when the power plant has stopped operating based on the freezing probability; and
- means for suspending operation of the antifreeze means until the wait time has elapsed from when the fuel cell power plant stops operating.

* * * * *